United States Patent [19]

Freissle

[11] Patent Number: 4,716,694
[45] Date of Patent: Jan. 5, 1988

[54] WEAR RESISTANT PANEL ARRANGEMENT

[75] Inventor: Manfred F. A. Freissle, Johannesburg, South Africa

[73] Assignee: Screenex Wire Weaving Manufactures (Proprietary) Limited, Alrode, South Africa

[21] Appl. No.: 934,621

[22] Filed: Nov. 24, 1986

[30] Foreign Application Priority Data

May 23, 1986 [ZA] South Africa ............... 86/3864

[51] Int. Cl.⁴ .................................................. E04B 1/38
[52] U.S. Cl. ................................... 52/127.6; 52/506; 52/764; 52/309.4; 404/40
[58] Field of Search ............ 52/764, 126.6, 508, 52/127.5, 169.1, 386, 391, 390, 506, 127.6, 716, 309.1, 309.4; 404/33, 34, 40, 45, 44; 446/108, 118, 122, 128

[56] References Cited

U.S. PATENT DOCUMENTS

| | | | |
|---|---|---|---|
| 2,509,669 | 5/1950 | Borst | 446/122 X |
| 2,956,653 | 10/1960 | Liskey | 52/126.6 X |
| 3,522,137 | 7/1970 | DeLaRiveBox | 404/40 X |
| 3,882,652 | 5/1975 | Marchello | 52/127.6 X |
| 3,946,529 | 3/1976 | Chevaux | 52/506 |
| 4,578,910 | 4/1986 | Germeroth et al. | 52/126.6 |

FOREIGN PATENT DOCUMENTS

| | | | |
|---|---|---|---|
| 1534572 | 8/1969 | Fed. Rep. of Germany | 404/34 |
| 1294682 | 4/1962 | France | 446/118 |
| 101116 | 4/1962 | Netherlands | 446/128 |

Primary Examiner—J. Karl Bell
Attorney, Agent, or Firm—Fitch, Even, Tabin & Flannery

[57] ABSTRACT

The invention provides for a wear resistant panel of a resiliently deformable material such as polyurethane having protrusions in the vicinity of the peripheral region of the panel by means of which the panel can be removably secured to a support structure, the panel being provided with at least one recess in the peripheral region of the panel into which recess a release tool can be forced to facilitate the removal of the panel from the support structure.

2 Claims, 6 Drawing Figures

WEAR RESISTANT PANEL ARRANGEMENT

BACKGROUND OF THE INVENTION

This invention relates to a wear resistant panel arrangement. In particular the invention relates to a fastening arrangement for a wear resistant panel arrangement for fastening panels to a support structure. The wear resistant panel arrangement may, for example, be screening panels for screening ores, or lining panels for lining chutes, bins, etc., used in the handling of ores.

In a wear resistant panel arrangement known to the applicant the panels have protrusions along their peripheral regions and are arranged in an abutting side-by-side relationship on a support frame, with the protrusions engaging a support frame through apertures in the support frame through which the protrusions extend. This arrangement ensures a secure fastening of the panels to the support frame. When it is desired to replace a panel the protrusions must be withdrawn through the apertures in the support frame. This requires force and while it is not normally any problem, it could be difficult to do so in certain circumstances, for example where there is limited working space within which to manipulate a release tool.

SUMMARY OF THE INVENTION

It is an object of the invention to facilitate the removal of panels in a wear resistant panel arrangement of the kind referred to.

According to the invention there is provided a wear resistant panel having protrusions of a resiliently deformable material located in the vicinity of the peripheral region of the panel by means of which the panel can be removably secured to a support structure, the panel being provided with at least one recess in the peripheral region of the panel into which recess a release tool can be forced to exert pressure to facilitate the removal of the panel from the support structure.

The recess may conveniently be provided at or near a corner of the panel. Conveniently, a plurality of such recesses may be provided, and a recess may be provided at or near each side of each corner of the panel.

The recess may be of a tapering configuration, tapering downwardly from the working surface of the panel to terminate at a zero depth some distance above the underside of the panel. The purpose of the tapering configuration of the recess is to prevent material from escaping from the working surface of the panel to the underside of the panel.

Conveniently, recesses on identical panels may be provided in identical positions on the peripheral regions of the panels so that when the panels are arranged side-by-side on a supporting structure, the recesses are in register with each other and thus ensure that a release tool can conveniently be inserted into the full recess thus formed by the two half recesses on the abutting panels.

If desired, a further recess may be provided on the rear or non-working surface of the panel immediately below the first recess. The function of the further recess is to further facilitate a release tool being forced underneath the panel between the panel and the support structure to thereby further facilitate the removal of the panel from the support structure.

The second recess may be provided underneath a corner of the panel, and conveniently, a plurality of such recesses may be provided, one underneath each corner of the panel.

BRIEF DESCRIPTION OF THE DRAWINGS

The invention is now described with reference to the accompanying drawings, in which.

DETAILED DESCRIPTION OF THE PREFERRED EMBODIMENT

Figure 1:
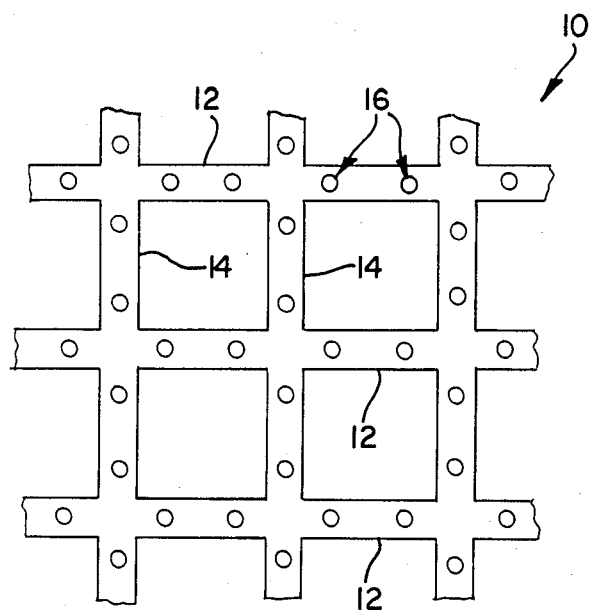
FIG. 1 shows a framentary plan view of a support frame for supporting a wear resistant panel arrangement in accordance with the invention.

Referring to the drawings, reference numeral 10 indicates in general a fragmentary plan view of a support frame for supporting a wear resistant panel arrangement in accordance with the invention. The support frame includes a plurality of intersecting support members 12 and 14 having apertures 16 for securing protrusions on the wear resistant panel arrangement which will be described with reference to the other Figures. The support frame 10 is conveniently fabricated of a suitable metal such as steel.

Figure 2:
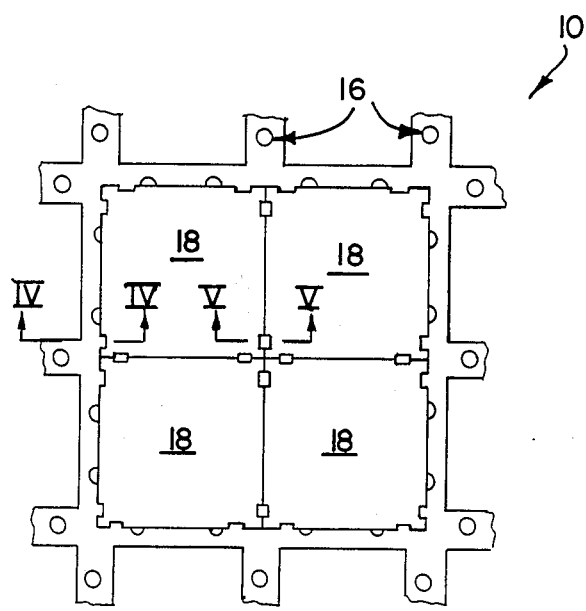
FIG. 2 shows a plan view of a plurality of panels in accordance with the invention arranged side-by-side on the support frame of FIG. 1.

Referring to FIG. 2, there are shown a plurality of wear resistant panels 18 secured side-by-side on the support frame 10. The panels 18 are of a suitable wear resistant, resiliently deformable material such as a suitable synthetic plastics material, for example polyurethane. The panels may be screening panels with screening apertures (not shown), or they may be lining panels, in which case no screening apertures are provided.

At the periphery of each panel 18, near each corner of the panel, there is provided a recess 20. Where two such panels abut each other side-by-side, as shown in FIG. 2, the half recesses on each panel register with each other and thereby form full recesses. The recesses 20 are described in greater detail with reference to FIGS. 4, 5 and 6.

Figure 3:
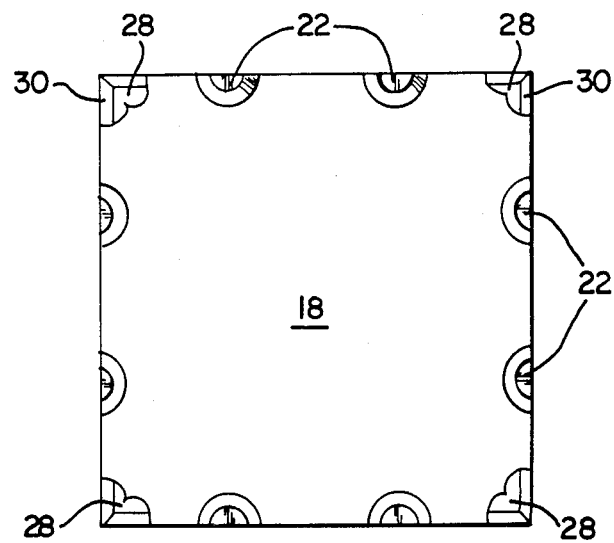
FIG. 3 shows a bottom plan view of one of the panels shown in FIG. 2.

Referring to FIG. 3, the underside of one of the panels 18 is shown. The panel has a series of protrusions 22 of a resiliently deformable material, for example polyurethane, spaced from each other along the peripheral region of the panel. Each protrusion 22 has a stem 22 and a tapering portion 26 which are shown in greater detail in FIG. 4. Further in FIG. 3, there is shown a second recess 28 in the rear or non-working surface of the panel below each corner. The recess 28 has chamfered sides 30 and it is shown in greater detail in FIG. 4.

Figure 4:
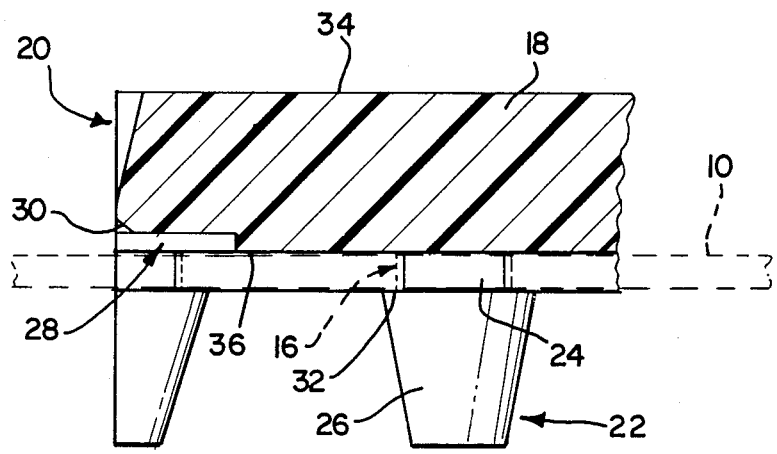
FIG. 4 shows on an enlarged scale a section on line IV—IV of FIG. 2.

Referring now to FIG. 4, a fragmentary sectional view of the panel 18 on an enlarged scale is shown. The panel is secured to the support frame 10 (shown in dotted lines) by means of the protrusions 22 which fit though the apertures 16 in the support frame. The tapering portion 26 of each protrusion facilitates the protrusion being fitted through the aperture 16 but the enlarged shoulder 32 on the protrusion, which is larger than the aperture 16, ensures that the protrusion, and thus the panel 18, are securely held on the support frame 16.

Referring further to FIG. 4, it is shown that the recess 20 on the peripheral region of the panel 18 is of a tapering shape which converges downwardly from the wearing surface 34 of the panel to a zero dimension some distance above the rear surface 36 of the panel. The recess 20 is positioned immediately above the recess 28 underneath each corner of the panel 28. The tapering shape of the recess 20 prevents material, such as material being screened on the working surface 34, from escaping from the working surface 34 to the bottom surface 36 of the panel.

Figure 5:
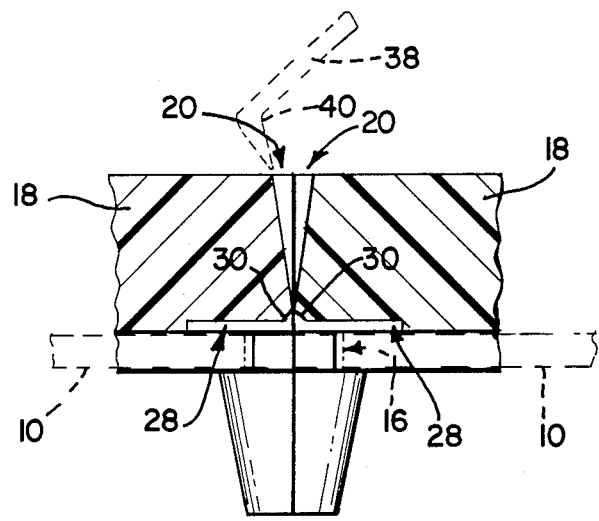
FIG. 5 shows a sectional view on line V—V of FIG. 2.

Referring to FIG. 5, a fragmentary cross-sectional view is shown of two panels 18 abutting side-by-side and being secured to the support frame 10 by means of their protrusions 22. The half recesses 20 on each panel 18 are in register with one another and thereby form a tapering full recess as shown in the drawing. Likewise, the second recesses 28 on the panels are in register with one another. When the panels are in the position shown in FIG. 5, a release tool 38 which is shown in dotted lines, can be inserted through the full recess formed by the half recesses 20 and can be manipulated through the recesses past the chamfered faces 30 on the second recesses 28, and into one of the second recesses 28 to lift the corner of the panel. This arrangement is shown in greater detail in FIG. 6.

Figure 6:
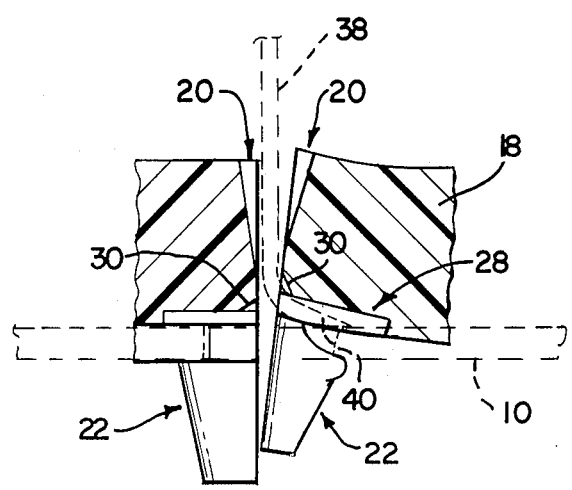
FIG. 6 shows the arrangement shown in FIG. 5 during a removal of a panel from the support frame.

Referring to FIG. 6, the release tool 38 is shown in position in one of the recesses 28 beneath the corner of one of the panels 18. By exerting leverage on the release tool 38, the end 40 of the release tool which is in position in one of the recesses 28, and which rests on the support frame 10, can exert an upward lifting force against the corner of the panel. By exerting sufficient leverage, and therefore sufficient force on the release tool 38, the protrusion 22 can be deformed sufficiently to permit the protrusion to be withdrawn through the aperture 16 in the support frame 10. Thereby the panel can be released from the support frame 10.

The recess 20 on each panel 18 facilitates the insertion of a release tool 38 between two abutting panels 18 and thereby facilitates the removal of the panels from the support frame 10. The second recess 28 underneath each corner 28 of the panel 18 further facilitates the operation of the release tool 38. Further, the chamfered face 30 on the second recess 28, also assists in the operation of the release tool 38, and thereby the release of the panel 18 from the support frame.

What is claimed is:

1. A wear resistant panel having a nonworking rear surface, protrusions of a resiliently deformable material located in the vicinity of a peripheral region of the panel by means of which the panel can be removably secured to a support structure, said panel defining a first recess in the peripheral region thereof into which recess a release tool can be forced to exert pressure to facilitate the removal of the panel from the support structure and said panel further defining a second recess on the rear, nonworking panel surface immediately below said first recess.

2. A wear resistant panel as claimed in claim 1, in which the second recess is provided underneath a corner of the panel.

* * * * *